United States Patent Office 3,182,406
Patented May 11, 1965

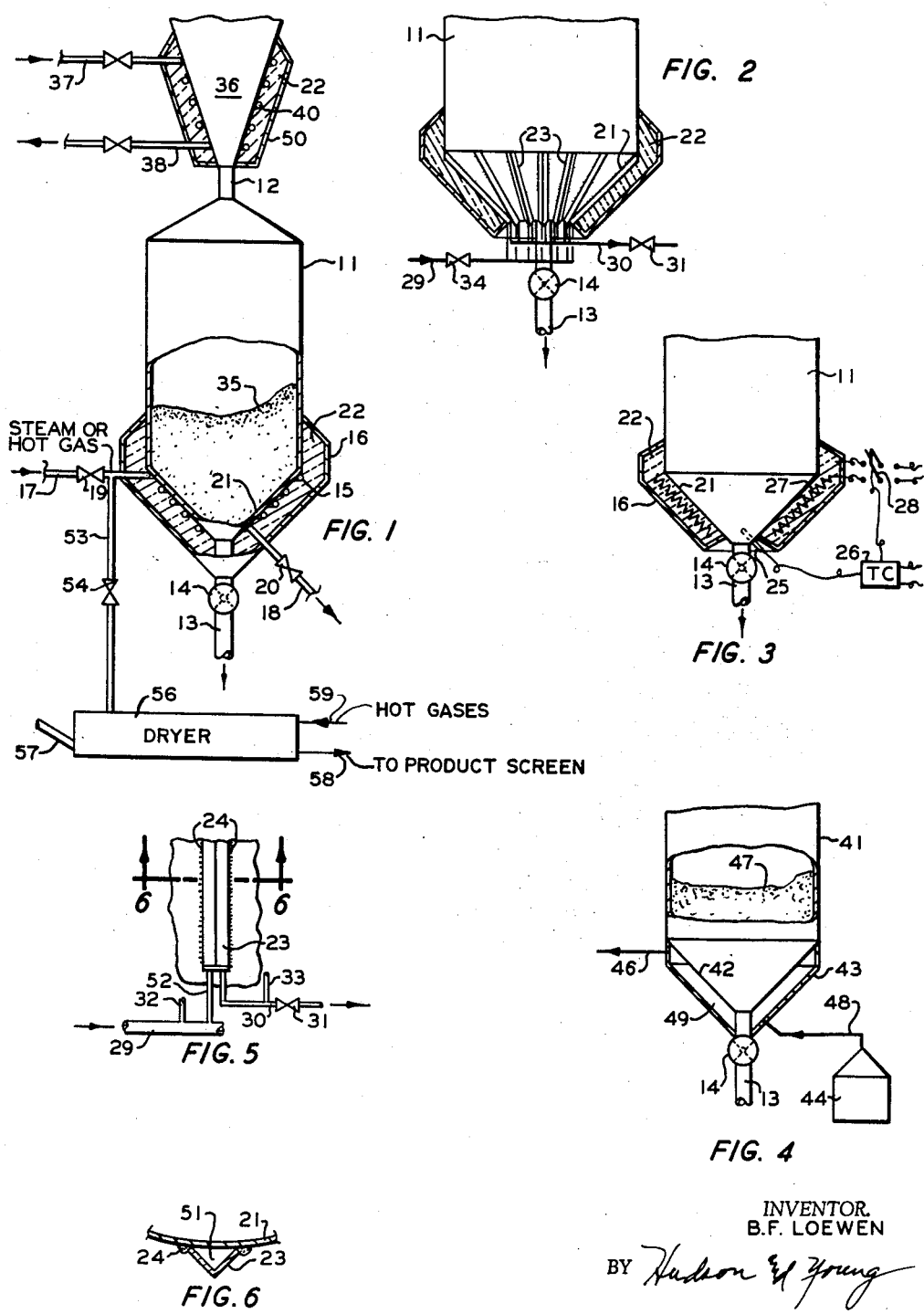

3,182,406
TREATMENT OF CARBON BLACK
Bruno F. Loewen, Borger, Tex., assignor to Phillips Petroleum Company, a corporation of Delaware
Filed Apr. 14, 1961, Ser. No. 103,062
6 Claims. (Cl. 34—39)

This invention relates to maintenance of carbon black in an easily flowable condition. In one aspect it relates to method for maintaining carbon black containing moisture in an easily flowable condition. In another aspect it relates to a method for the elimination of tendencies of mixtures of carbon black and moisture to cake and to pack in vessels. In another aspect it relates to apparatus and a method for freely feeding carbon black containing moisture from a run storage, surge or other vessel to a process.

In the handling of carbon black the tendency of the black to stick or adhere to the walls of carbon black handling equipment has been a major problem. Carbon black has been dry pelleted in rotating tubular mills and in many instances the black is sticky and deposition of the black on the walls of the mills has occurred. The deposited or caked black breaks off with the result that satisfactory pelleting was difficult to achieve. This stickiness and caking on the mill was, in some instances, believed due to an electrostatic phenomenon. In some instances scrapers were employed to prevent undue buildup of the cake on the mill walls.

In the separation and recovery of carbon black from gaseous effluent of carbon black reactors, the separated loose black is deposited in surge tanks from which it is attempted to withdraw the black at a constant rate for feeding to a subsequent process. In the past stirrers, augers, star valves, vibrating feders, and many other types of apparatus have been used in an attempt to feed the carbon black from surge tanks at a constant and uniform rate with varying degrees of success. In many instances these mentioned pieces of equipment become covered with caked black. There are times when the carbon black flow from these surge tanks can be maintained at a constant and relatively uniform rate and there are other times, using the same feed equipment, when the rate of feed withdrawal from the tank is very erratic.

It has been found that this erratic flow of loose carbon black is at least in part the result of caking and packing of the carbon black near the exit opening of the surge tank. This caking often occurs when the tank is first put on stream and when the carbon black is not removed from the tank for a period of time. Ordinarily, as long as the carbon black is entering the tank at a temperature of about 250° F. or higher and is being continuously withdrawn from the tank, the rate of withdrawal of the black is more nearly constant.

An object of this invention is to provide a method for the maintenance of loose carbon black in an easily flowable condition. In one aspect it relates to a method for providing carbon black containing moisture in an easily flowable condition. In another aspect it relates to a method for the elimination of tendencies of mixtures of carbon black and moisture to cake and to pack in vessels. In another aspect it relates to a method for freely feeding carbon black containing moisture from a run storage, surge or other vessel to a subsequent process. Still other objects and advantages of this invention will be realized upon reading the following description which, taken with the attached drawing, forms a part of this specification.

This invention teaches a method and illustrates apparatus useful for the elimination of sticking on the inside surfaces of vessels, surge tanks, and the like containing carbon black and thereby providing for a constant rate of flow of carbon black from the tanks to subsequent processing. The objects of this invention are accomplished by insulating the bottom conical sections of such vessels and providing heating elements adjacent the outside surfaces of the lower portions thereof. The heating elements are insulated to prevent loss of heat to the atmosphere. By the practice of this invention it may be unnecessary, under some conditions, to add heat to the coils adjacent insulated tanks as long as the mixtures of carbon black and moisture being fed into the tanks are maintained at temperatures of about 250° or higher and if the carbon black is being continuously removed about as fast as it is being added to the tanks. In some instances, however, particularly when the rates of withdrawal are less than the rates at which it is fed into the tanks, it is necessary to add heat to the bottom surface of the tank to maintain the black flowable.

The effluent gases from carbon black producing reactors contain in addition to the produced carbon black, gases of combustion. These gases of course are rich in water formed by the combustion of a portion of the hydrogen of the feed material to the reactor. Also, water is added to these hot gases from the reactor by sprays for cooling to temperatures at which the furnace effluent can be passed into means for separation and recovery of carbon black. Bag filters are now frequently used for separation of the carbon black from the furnace gases. Also, electrostatic precipitators are in wide use. Irrespective of the means for separation of the carbon black from the furnace gases the separated carbon black must be transported from the carbon black separation area to another location for pelleting. In some instances air is used in pneumatic conveying systems and when air is used the residual moisture content of the separated carbon black being conveyed is diluted but still there is a tendency for caking of the carbon black in the surge tanks causing the difficulties which this invention eliminates. However, because the carbon black separated by bag filters or by electrostatic precipitators is hot, it is inadvisable, in many instances, to use air in pneumatic carbon black conveyors because of the explosion hazards. It is preferred, however, to employ gases lean in oxygen such as off gases from electrical precipitators or from bag filters for conveying of the carbon black. When such gases are used and since they contain considerable amounts of moisture, moisture is present in the carbon black entering the run tanks. Pneumatically conveyed carbon black ordinarily at first enters a cyclone separator for removal of the conveying gas. Even though the black is separated in such apparatus from the conveying gases, the carbon black still contains some moisture. From the bottom of these separators the black drops or flows into surge tanks which retain the black for such period of time and to maintain a proper supply for constant feeding to such subsequent processes as pelleting. Whether the black contains moisture or is dry, the tendency to stick to tank or vessel walls still exists.

In the drawing FIGURE 1 illustrates, in diagrammatic form, apparatus suitable for carrying out the objects of this invention. FIGURE 2 illustrates an alternate embodiment of the apparatus illustrated in FIGURE 1. FIGURES 3 and 4 illustrate additional alternate embodiments of the apparatus illustrated in FIGURE 1. FIGURE 5 illustrates, on an enlarged scale, a portion of the apparatus of FIGURE 2. FIGURE 6 is a sectional view taken along the line 6—6 of FIGURE 5.

In the drawing reference numeral 11 identifies a surge tank such as used for run storage and for regulation of carbon black feed to subsequent processes. Such a surge tank is ordinarily provided with at least a lower conical section 21, FIGURE 1, for ease of removal of product from within the tank. Reference numeral 36 identifies a portion of the conical section of a cyclone separator which, as mentioned hereinbefore, is employed for removal of gases used in the pneumatic conveying of carbon black. Thus, in this case pneumatically conveyed carbon black enters the upper portion of the cyclone separator and the separated carbon black drops downward into the conical section 36. The gases separated from the cyclone are withdrawn from the top thereof in the usual manner for such disposal or return to the carbon black recovery system, as desired. Thus, the separated carbon black from the separator flows through a conduit 12 into the surge vessel 11. Reference numeral 35 identifies carbon black in the bottom portion of this vessel. From the surge vessel the black passes through a conduit 13, the flow therethrough being regulated by a star valve 14. Surrounding the lower conical section 21 of vessel 11 is a coil 15 provided with an inlet conduit 17 and valve 19 and an outlet conduit 18 and valve 20. Surrounding this coil is a case 16 filled with insulation 22. As illustrated in FIGURE 1, steam or hot gases enter this apparatus from a source, not shown, through conduit 17 as regulated by valve 19 and this steam or hot gases pass through coil 15 and exit by regulation of valve 20 in conduit 18. Heat is thus provided for maintaining the bottom cone 21 in a heated condition.

In many cases it has been found that in the lower conical sections of cyclone separators the same carbon black packing and caking occurs as that which occurs in the surge tank 11. Under such conditions it is preferable to employ a similar heating apparatus around this conical section 36 of the separator as was provided around the bottom cone of tank 11. Thus, a coil 40 is provided around the cyclone cone with inlet conduit 37 and outlet conduit 38, for inlet and outlet of heating medium. This coil is surrounded by a case 50 containing insulation 22. As mentioned relative to tank 11, steam or hot gases can be introduced through conduit 37 for passage through coil 40 and exit through conduit 38.

In the alternate embodiment illustrated in FIGURE 2, in place of the coil 15 or 40, I merely weld to the bottom conical section 21 a plurality of angle irons 23. These angle irons are positioned radially extending from a point near the outlet end to the upper end of the cone. These angle irons are welded to this cone in such a manner as to provide a three-sided channel, as illustrated in FIGURES 5 and 6. Angle irons 23 are illustrated in FIGURES 5 and 6 as being welded at 24 to the outer surface of the conical section of the surge tank. The upper ends of these three-sided conduits are closed ends. As illustrated in FIGURE 5, reference numeral 29 identifies a conduit through which steam or hot gas enters the channel or conduit 51. A small conduit 52 conveys the heated fluid from conduit 29 to the lower end of channel 51. An outlet conduit or tube 30 is also connected to the lower end of the angle irons 23 as illustrated in FIGURES 2 and 5 for outlet of condensate when steam is used and for outlet of the gases when hot gases are used as the heating medium. If it is desired to maintain steam or gas pressure within conduit 51, a valve 31 is provided in outlet conduit 30 for regulation of this pressure. The conduit or tube 33 is provided for connecting with the lower end of another angle iron 23. There will actually be a plurality of conduits 33, each one of the plurality being connected to the lower end of one of the angle irons. It is not necessary to provide an outlet at the upper end of these angle iron defined channels since ample heat is transferred from the hot gases or steam entering the bottom ends. These hot gases or steam passing upward, as for example through conduit 52, enters conduit 51 at a fairly high velocity and flows upward substantially through the entire length of channel 51. When steam is used as the heating medium, any condensate formed within channels 51 flows downward and is withdrawn through conduit 30. Conduit 32 is actually a plurality of conduits one each of which is attached to the lower end of a channel iron 23 for inlet of the heating fluid. Valve 31 regulates the back pressure within the several conduits.

In FIGURE 3 is illustrated an electrical heating means for providing heat to the bottom conical section 21 of vessel 11. In this case an electrical resistance heater 27 is provided adjacent the outer surface of cone 21 and electrically insulated therefrom. A switch 28 regulates the electrical current to this heating element 27. If desired, the control of this electrical heating is automatic in the use of a thermocouple 25 extending within the lower conical section 21, as illustrated. This thermocouple is connected with a temperature controller 26 with the controller actuating switch 28 to open or to close the circuit to the heating element 27. For example, when it is desired to maintain the temperature in the black near the outlet of cone 21 at approximately 250° F., the temperature controller will be set to open switch 28 when the temperature, as sensed by thermocouple 25, is about 255° F. and closes switch 28 when the thermocouple senses a temperature of about 245° F.

In still another embodiment of this invention, as illustrated in FIGURE 4, the conical section 42 of tank 41 is enclosed within jacket 43 to provide a space 49 for passage of steam or hot gases. As illustrated in this figure, hot gases originate in a fired heater 44 and pass through a conduit 48 into the space 49 within the jacket and exit through a conduit 46, or if desired the hot gases can be passed in the reverse direction through space 49. Reference numeral 47 identifies carbon black in the lower portion of the vessel.

In one instance before run or surge tank 11 of FIGURE 1 was provided with coils 15 and insulation 22 inside jacket 16, it was necessary to adjust the feed rate of the carbon black leaving the vessel 11 by adjustment of the r.p.m. of the star valve 14 each five to fifteen minutes in an attempt to maintain at least an approximately uniform withdrawal rate. Such a feed was being passed to a wet pelleting process which required a fairly uniform feed for the uniform operation of carbon black wetting equipment and pelleting equipment. When jacket 16 was installed and insulation 22 provided enclosing steam or hot gas coils 15 but without the use of steam or hot gas heating medium, the star valve needed to be adjusted each fifteen minutes to an hour in order to maintain a reasonably constant flow rate of carbon black through conduit 13.

However, when steam or hot gases were passed through coil 15 at a temperature of about 250° F. or slightly higher, the rate of rotation of star valve 14 was set and that setting lasted substantially indefinitely since no caking was detected and star valve operation was uniform.

When carbon black passing through such surge vessels, as herein described, is passed to wet pelleting processes for the production of wet pellets, hot flue gases from the pellet driers can be used as the source of hot gas for passage through coils 15 or through the angle iron channels 51 for heating the conical section of the surge vessels. The flue gases from the pellet driers possess a temperature of about 300° to 400° F. and such gases posses ample temperature and heat for maintenance of these conical sections at such temperatures as keep the carbon black in an easily flowable condition. Such a pellet drier is described by W. R. King in U.S. 2,949,349, issued August 16, 1960. Drier 56 is charged with wet pellets via conduits 57, hot gases for drying the pellets via line 59 and dried pellets are discharged via line 58. Hot gases from drier 56 pass through conduit 53 with valve 54 being open and valve 19 in conduit 17 closed.

While certain embodiments of the invention have been described for illustrative purposes, the invention obviously is not limited thereto.

I claim:

1. A method for flowing apparently dry, flocculent carbon black from the lower portion of an enclosed zone, said carbon black having a tendency to pack and cake in said enclosed zone and to resist flowing therefrom, comprising passing hot gases from a wet carbon black pellet drying operation into contact with the lower wall portion of the exterior of said zone, heat from said hot gases passing through said lower wall portion into said zone and into the carbon black therein, thereby eliminating said tendency to pack and cake and to lessen the resistance to flowing, and passing the heated carbon black from said lower portion of said zone.

2. In a process wherein loose, flocculent carbon black is recovered from the gaseous effluent from a carbon black reactor in apparently dry form, the recovered flocculent black is passed into a vessel having a hopper-shaped bottom terminating in an outlet conduit having flow-control means therein, and said carbon black is fed from said vessel thru said conduit as needed by operation of said flow-control means and wherein said carbon black resists flowing freely and uniformly, the method of improving the uniformity of flow of said black from said vessel thru said conduit which comprises heating said bottom to a temperature of at least 250° F. so as to heat the adjacent carbon black to substantially a corresponding temperature by indirect heat exchange and render said carbon black readily flowable.

3. A method for flowing apparently dry flocculent carbon black comprising providing said carbon black in the interior of a storage zone having a hopper shaped bottom wall terminating in an outlet conduit, said carbon black having a tendency to pack and cake on the inner surface of said wall and to resist flowing, applying heat to the outer surface of said wall, said heat passing inwardly through said wall into said carbon black and substantially heating the same to a temperature of at least 245° F., thereby eliminating said tendency to pack and cake and to resist flowing, and flowing the so heated carbon black from said zone thru said conduit.

4. The method of claim 3 wherein said carbon black adjacent said bottom wall is heated to a temperature in the range of about 245 to 400° F.

5. In the handling and conveying of apparently dry hot flocculent carbon black wherein said black is passed at a temperature of at least 250° F. into a vessel having a bottom terminating in a withdrawal line provided with flow control means therein and the input rate of carbon black exceeds the output rate, thereby allowing the black in said bottom to cool substantially below 250° F., whereby the uniform flow of said black into said withdrawal line is obstructed, the improvement comprising heating the black adjacent said bottom to a temperature in the range of about 250 to 400° F. so as to improve flow thereof into said line.

6. The method of improving the flow of apparently dry flocculent carbon black from the lower portion of an enclosed walled zone containing a mass of said black at a temperature substantially below 250° F. which resists flowing uniformly thru an opening in said lower portion of said zone, comprising heating the carbon black in said lower portion of said zone to a temperature in the range of about 250 to 400° F. by heat exchange thru the wall of said zone.

References Cited by the Examiner
UNITED STATES PATENTS

| Re. 9,711 | 5/81 | Hanna | 34—165 X |
|---|---|---|---|
| 254,077 | 2/82 | Welch. | |
| 1,262,448 | 4/18 | Caskey | 34—175 |
| 1,557,921 | 10/25 | Buel | 34—165 X |
| 1,713,237 | 5/29 | Morin | 34—168 X |
| 1,807,884 | 6/31 | Wiegand | 23—209.9 |
| 2,131,686 | 9/38 | Heller et al. | 23—314 |
| 2,163,630 | 6/39 | Reed | 23—209.8 |
| 2,599,978 | 6/52 | Davis et al. | 222—146 |
| 2,705,092 | 3/55 | Woodruff. | |
| 2,817,156 | 12/57 | Gilliam | 34—39 |

NORMAN YUDKOFF, *Primary Examiner.*

CHARLES O'CONNELL, *Examiner.*